United States Patent [19]

Abos

[11] 3,883,055

[45] May 13, 1975

[54] POWER STYLUS

[75] Inventor: Ralph L. Abos, Whittier, Calif.

[73] Assignee: Dynapunch Systems, Inc., El Segundo, Calif.

[22] Filed: June 12, 1974

[21] Appl. No.: 478,466

[52] U.S. Cl. ..................... 225/103; 30/367; 225/93

[51] Int. Cl. ................................................ B26f 3/00

[58] Field of Search ............. 225/93, 103; 30/164.6, 30/366, 367, 368

[56] References Cited

UNITED STATES PATENTS

| | | | |
|---|---|---|---|
| 2,384,707 | 9/1945 | Sweet | 30/367 |
| 2,460,113 | 1/1949 | Young | 30/367 |
| 3,177,595 | 4/1965 | Yonker et al. | 35/48 R |
| 3,395,704 | 8/1968 | Frey et al. | 30/366 X |

*Primary Examiner*—J. M. Meister
*Assistant Examiner*—Fred A. Silverberg

[57] ABSTRACT

A power stylus for use in punching pre-scored areas from machine precessable record cards or the like. The stylus employes a compound pinion gear cluster coupled to a perforating point. A driving force is applied to the housing which transmits the force to the perforating point through the gear cluster. The force transmitted to the perforating point is greater than the driving force because of the mechanical advantage derived from the compound pinion gear.

10 Claims, 11 Drawing Figures

POWER STYLUS

BACKGROUND OF THE INVENTION

1. Field of the Invention

The invention relates generally to a power stylus which may be used for punching pre-scored areas from sheet members and specifically for punching cards on manual recording devices.

2. Prior Art

Data recording cards which are scored in such a manner as to provide a plurality of areas thereon have been known in the prior art. These cards are normally used for data collection in conjunction with manual recording devices. Often the data being collected is only available in the field and at several different locations. Thus, manual recording devices have been used for transporting the record cards and for providing a surface on which the record cards may be placed and selective pre-scored areas may be punched therefrom for registering data.

Manual recording and punching equipment devices cause numerous errors in the recording of data. One problem occurs when sufficient force is not applied to the pre-scored area or when the force is eccentrically applied to the pre-scored area. If this occurs, the pre-scored area or chip will not be cleanly punched from the card but will become hinged from one side or the other. If this area becomes hinged, as the cards are stacked or restacked, the hinged chip tends to return to the hole from which it was struck. Thus, when the card is machine processed or read by manual techniques, errors may occur which are hard to discover by backchecking.

Elaborate and costly means have been developed to insure removal of the chips in order to eliminate possible sources of error. Frequently the equipment must be operated slowly to insure complete removal of the chips and a careful check must immediately follow to insure that the chips have been completely removed. In many instances, hinged chips have to be manually removed from the record cards. This causes a loss in time in data collection and presents the possibility of error. Most manually operated data recording devices employ punching instruments which have a solid pin which is capable of being disposed through the pre-scored record card. These solid pin punching instruments tend to create the aforementioned problems.

Prior art cutters and scribers disclose devices which have a point which is generally enclosed within a housing and which is capable of being projected therefrom. However, none of these devices provide an increase in the punching force applied to the piercing end of the instrument.

Other prior art devices provided various elements which are capable of being moved by a gear train, such that a mechanical advantage could be applied thereto. However, none of these prior art devices relate to a hand held pencil like device which is used for removing pre-scored areas from record cards. In addition, none of the devices are self-contained and contain a gear cluster which provides the mechanical advantage. In addition, the prior art devices employ a motor means or other source of power, which activates a gear cluster and drives the instrument.

The present invention employes a device in which an increase in punching force is derived from gears which are self contained and the driving force is applied to the housing and transmitted to the punching end through a gear cluster. In addition, the present invention provides a device which supplies a punching force which is greater than the driving force to the punching chip and thereby completely removes the chips from the record card without leaving any hinged chips. The present invention may be driven by a nuematic, mechanical or manually exerted force and is capable of being easily transported along with a manual recording device.

SUMMARY OF THE INVENTION

A power stylus for use in punching pre-scored areas from machine processable record cards or the like is disclosed. The power stylus is comprised of a compound pinion gear cluster enclosed within a body having a forward sleeve which is insertable within a rear sleeve. The driving force is applied to the rear sleeve and a linear motion is transmitted from the compound gear cluster and to the perforating pin so that the pin is driven from the housing with a greater force than the driving force. The resultant force of the pin is related to the ratio of the compound gear cluster and the driving force. A spring disposed in the body urges the sleeves and pin to retain their original position, after the driving force is withdrawn. It is understood that various parts of the stylus may be reversed or rearranged consistent with the essence and spirit of the invention.

It is, therefore, an object of the present invention to provide a power stylus which is capable of exerting a force for punching pre-scored areas from record cards which is greater than the driving force.

It is an additional object of the present invention to provide a stylus which will reliably remove pre-scored areas from record cards regardless of the various incident uses by different persons.

DETAILED DESCRIPTION OF THE PREFERRED EMBODIMENT

Figures 1, 2, 3, 4, 5, 6:
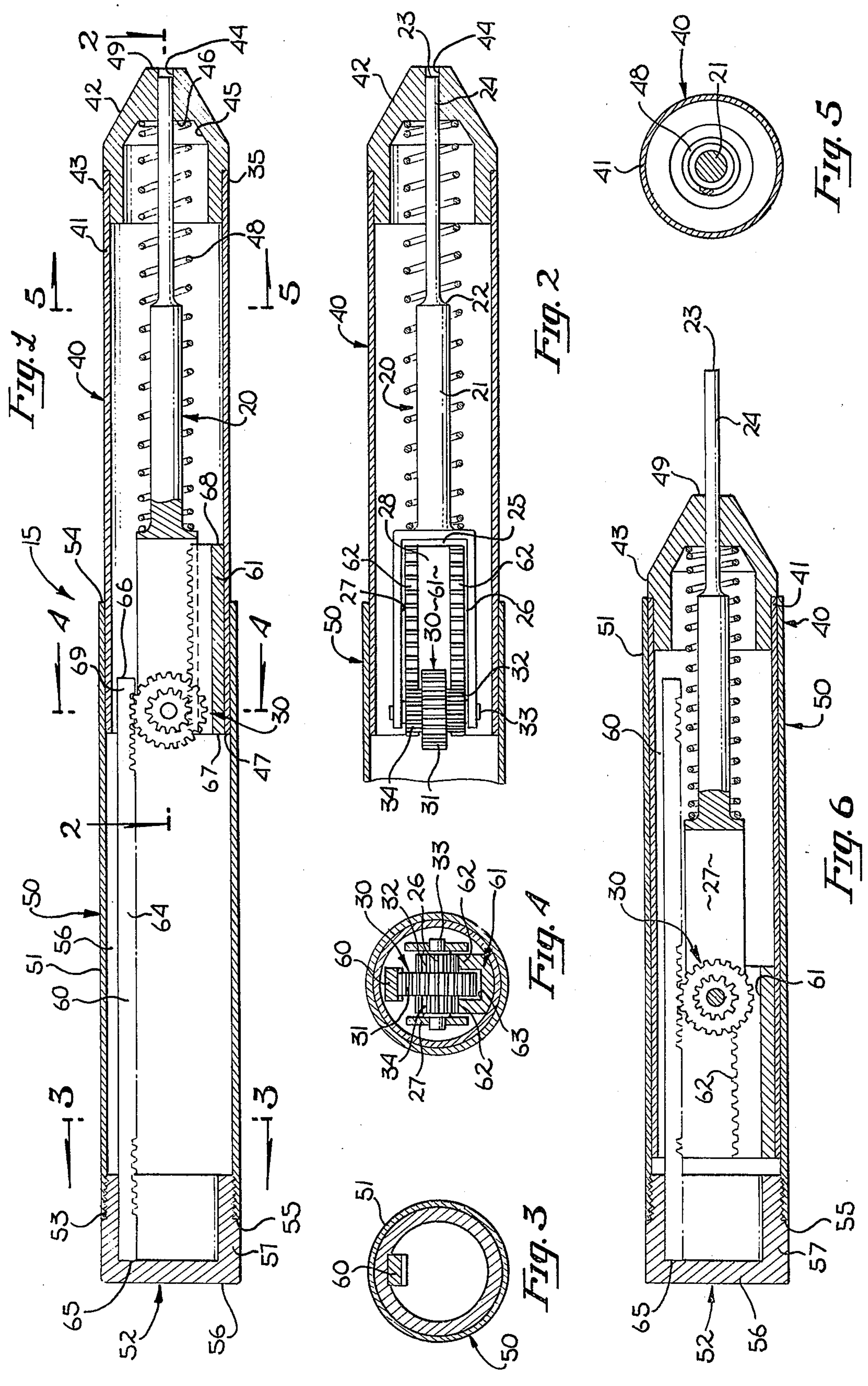
FIG. 1 is a cross sectional view of the present invention taken along the longitudinal axis thereof.
FIG. 2 is a blown-up sectional view of FIG. 1 rotated 90° clockwise illustrating the clevis, perforating point and compound gear cluster.
FIG. 3 is a cross sectional view taken along line 3—3 of FIG. 1 illustrating the rear sleeve and first gear rack.
FIG. 4 is a cross sectional view taken along line 4—4 of FIG. 1 illustrating the compound gear cluster and gear racks.
FIG. 5 is a cross sectional view taken along line 5—5 of FIG. 1.
FIG. 6 is a cross sectional view taken along the longitudinal axis, illustrating the device with the perforating point is fully extended.

The present invention is a power stylus which is capable of punching pre-scored areas from machine processable record cards. The stylus driving force may be applied by a nuematic, mechanical or manual force with the latter being the preferred embodiment as shown in FIGS. 1 through 6. The point of the power stylus is capable of being thrust rapidly through a prescored area on a record card and thereby cleanly remove it therefrom.

Now referring to FIG. 1, one form of the stylus of the present invention will be described. The stylus 15, is comprised of several basic components; a perforating pin 20, a compound gear cluster 30, a forward and rear sleeve 40 and 50, a cap 52, a guiding end 42 and a first and second gear rack 60 and 61. The components of the presently preferred embodiment are formed from metal or plastic, however, any suitable alternative may be employed which provides the requisite durability, stiffness and lubricating requirements. These basic components are more fully described below.

The rear sleeve 50 which is tubular shaped, has one end 54 which is open and a second end 55 which is threaded with threads 53. The threads 53 are contained on the inner portion of the cylindrical wall 51. A cap 52, having an end 56 and a side wall 57 is capable of being coupled to the rear sleeve 50 by thread means 53. The inner diameter of the cap 52 is smaller than the inner diameter of the sleeve 50 by an amount approximately equal two times the thickness of the sleeve wall 51. Thus, when the cap 52 is coupled to the sleeve 50 a small step is formed between the interior of the sleeve wall 51 and the interior of the cap 52. It is, of course possible to make sleeve 50 and cap 51 a single component.

The forward sleeve 40 is also tubular shaped, and has an outer diameter which is slightly smaller than the inner diameter of the rear sleeve 50. The forward sleeve 40 has a wall 41 which is approximately as thick as the wall 51 of the rear sleeve 50, a first end 47 and a second end 35. The inner surface of end 35 is threaded with threads 43.

The guiding end 42 is cylindrical and has a tapered forward portion forming a dull point 49. The cylindrical portion of the forward end 42 is adapted with threads which are capable of engaging the threads 43 on the forward sleeve 40. A bore 45, is formed in the guiding end 42 and forms a forward wall 46. An aperture 44, is disposed through the guiding end 42 along the longitudinal axis thereof. The diameter of the aperture 44 is considerably smaller than the diameter of end 42 and the diameter of the bore 45 is considerably greater than the diameter of the aperture 44 but smaller than the diameter of the end 42. The guiding end 42 and forward sleeve 40 may be formed as a single component.

The compound gear cluster 30, is comprised of three pinion gears, and is best shown in reference to FIGS. 2 and 4. The major pinion gear 31 is disposed in a juxtapose position between two minor pinion gears 32 and 34. The compound gear cluster 30 is permanently but rotably attached to clevis 28 by pin 33 which serves as an axis on which the compound gear cluster may rotate. The clevis 28 has two side members 26 and 27 and a base plate 25, best shown in FIG. 2. A perforating pin

20 is attached to the center of the base plate 25 of the clevis 28 by bolting or other methods well known in the art for securing two members together. The perforating pin extends away from the base 25 and away from the gear cluster 30. The perforating pin 20 is formed from a solid cylindrical member which may be made from metal, plastic or other rigid material. The first portion 21 of the perforating pin 20 tapers down to form a smaller portion 24 suitable to remove the chip from the card. This smaller portion 24 has a diameter which is slightly smaller than the diameter of the aperture 44 in the forward end 42 of the forward sleeve 40.

A first gear rack 60 having teeth 64 is coupled to the interior surface of the side wall 57 of the cap 52. This gear rack 60 is disposed such that its first end 65 is adjacent the rear portion 56 of the cap 52 while the other end 66 projects toward the open end of sleeve 50 and is not as long as the sleeve 50 (e.g. two-thirds as long). The teeth 64 in the gear rack 60 are engagable with the main gear 31 of the compound gear cluster 30. Near end 66 a stop 69 is formed by omitting teeth 64 therefrom.

A second gear rack 61 is coupled to the interior of the forward sleeve 40. The first end 67 of the second gear rack is positioned so as to be adjacent end 47 of the forward sleeve 40 while the second end 68 projects toward the forward end 35 of the forward sleeve 40. The second gear rack 61 has a length shorter than rack 60 (e.g. approximately equal to one quarter of the length of the first gear rack 60). The rack 61 is generally rectangular in cross section and has a rectangular trough 63 disposed along the longitudinal length as shown in FIG. 4. The trough 63 has a width sufficient to permit the main gear 31 to be disposed therein without engaging the sides of the trough 63. The depth of the trough 63 is sufficient to allow the main gear 31 to be disposed within the trough 63 without contacting the base of the trough while the teeth 62 on the separated upper surfaces engage the teeth of the pinion gears 32 and 34.

The power stylus 15, is formed by first screwing cap 52 onto the rear sleeve 50. When the cap 52 is in position the gear rack 60 extends forward and is parallel to wall 51 of the rear sleeve 50. A small gap 56 is defined between the gear rack 60 and the wall 51. The compound gear cluster 30 is then coupled to the clevis 28 by pin means 33 and the perforating pin 20 is coupled to the base 25 of the clevis 28. The clevis and gear cluster are then disposed into the rear sleeve 50 by holding the clevis and gear cluster in a horizontal plane during insertion into the rear sleeve which enables gear 31 to clear stop 69. Then the clevis and gear cluster are positioned such that the major pinion gear 31 engages the teeth 64 of the first gear rack 60. A coil spring 48 having a length greater than the total length of the perforating pin and a diameter smaller than bore 45 and base 25, but larger than the diameter of pin 20 is disposed around the body of the perforating pin with one end positioned against the base 25 of the clevis 28.

Next, the forward sleeve 40 is inserted into the rear sleeve 50 such that the teeth 62 of the gear rack 61 engage the teeth of the pinion gears 32 and 34. In this position, the second gear rack 61 is disposed opposite the first gear rack 60, or 180° from the first gear rack 60. As end 47 of the forward sleeve 40 is inserted in rear sleeve 50 the wall 41 of the forward sleeve 40 slides into gap 56 formed between the first rack 60 and wall 51 of the rear sleeve 40. Guiding end 42 is next secured to the forward sleeve 40 by thread means 43. This positions the perforating pin 20 such that its forward portion 24 may extend through aperture 44 in the forward end 42. As the guiding end 42 is coupled to sleeve 40 the coil spring 48 is compressed between the base 25 of the clevis 28 and the forward wall 46 of bore 45. Thus, the spring exerts a force which urges the forward sleeve to become separated from the rear sleeve 50. However, separation will not occur because gear rack 60 has been formed thereon, a stop 69 on end 66. This stop prevents the major gear 31 from disengaging from the first gear rack 60. The smaller pinion gears 32 and 34 are also prevented from rotating in a direction which would disengage the forward sleeve 40 from the rear sleeve 50 when the major gear 31 becomes locked by stop 69. However, the stop only prevents rotation that would permit gear 31 from disengaging the first rack 60 and motion may be compelled in the opposite direction.

The power stylus 15, when assembled as described above, may be used for punching pre-scored areas from machine processable record cards. The power stylus is of particular advantage because it increases the driving force and by it's motion provides a positive indication to the user that punching has been completed. As described herein, the perforating pin will exert approximately four times the force on the prescored record card as is exerted in cap 52. This increase is provided by the compound gear cluster and its arrangements with the two gear racks. However, because of this arrangement the cap 52 and sleeve 50 will be required to move vertically four units for every one unit that the perforating pin 20 need be projected from the tip 49 of the forward end 42. This increase in motion is advantageous as it minimizes the manual dexterity required to operate the stylus. In use, the tip is positioned above a pre-scored area which requires punching. A force is applied to the cap 52, which drives the rear sleeve 50 forward onto the forward sleeve 40 until end 47 of forward sleeve engages the end of cap 52 which acts as a mechanical stop. At this point, the coil spring 48 is fully compressed and urges the rear sleeve back into its original position.

DETAILED DESCRIPTION OF THE SECOND EMBODIMENT

A modified but very similar form of the invention is illustrated in FIGS. 7 through 11. In this embodiment, a floating activating gear rack is employed to eliminate any damage to the internal mechanism due to inadvertent co-axial twisting of the forward and rear sleeve. The construction also allows the entire assembly to be fabricated with only one visible joint.

Figures 7, 8, 9, 10, 11:
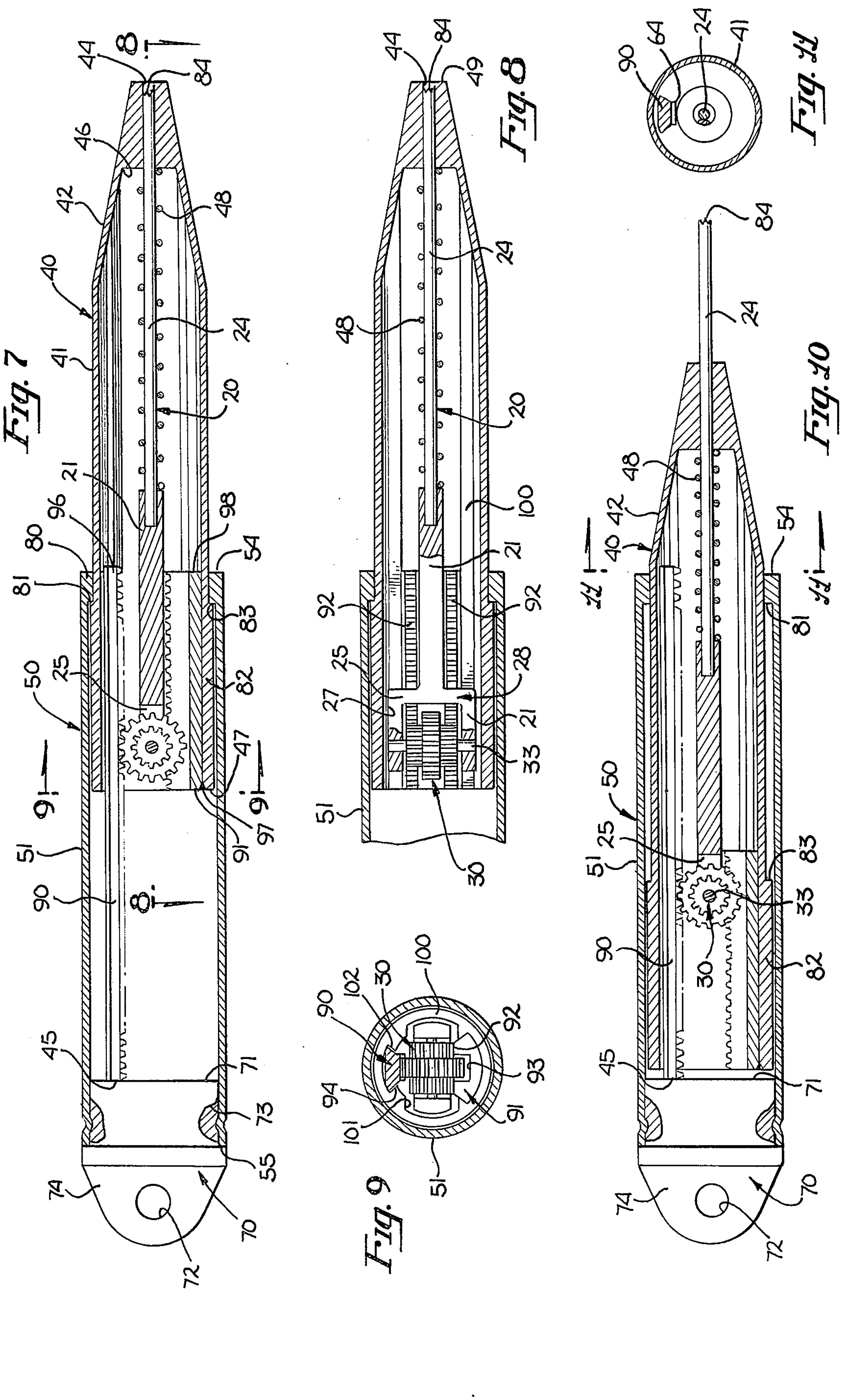
FIG. 7 is a cross sectional view of the second embodiment of the invention taken along the longitudinal axis thereof.
FIG. 8 is a blown-up sectional view of FIG. 7 rotated 90° clockwise.
FIG. 9 is a cross sectional view taken along line 9—9 of FIG. 7.
FIG. 10 is a cross sectional view taken along the longitudinal axis of FIG. 7 showing the perforating point fully extended.
FIG. 11 is a cross sectional view taken along line 11—11 of FIG. 10.

Now referring to FIG. 7, front end 54 of the rear sleeve 50 with a thickened portion 80 formed on the interior surface is shown. The juncture between the thickened portion 80 and the sleeve 50 is a vertical dislocation 81, having a height equal to approximately one-half the thickness of the wall of the rear sleeve. The back end 47 of the forward sleeve 40 has a thickened portion 82 formed on its exterior surface. The juncture between the thickened portion 82 and the body 41 of the forward sleeve is also a vertical dislocation 83. When the forward sleeve 40 is positioned through rear sleeve, the engagement of vertical dislocations 81 and 83 on the sleeves act as stops preventing the forward sleeve from passing through the rear sleeve.

The thickened portion 83 on the forward sleeve may have a length approximately equal to the length of gear rack 91 minus the length of the thickened portion 80 of the rear sleeve. This combination of lengths permit the perforating point 84 to be fully retracted into the forward sleeve before the dislocations engage each other. The forward sleeve 40 is further modified so as to be formed from unitary tubular member 42. The exterior of the forward end 49 of the tube tapers to form a dull point having an aperture 44 disposed therein. The interior of the tube tapers to form a generally cylindrical cavity having a base 46 capable of receiving one end of coil spring 48.

The gear racks 90 and 91 are also formed slightly different from that of the first embodiment as shown in FIGS. 8 and 9. Gear rack 91 is formed similar to gear rack 61, however, the exterior periphery is not rectangular, but has a generally rounded back portion which is capable of being coupled to a positionable housing 100. The positionable housing 100 has a generally tubular exterior having a diameter slightly smaller than the inner diameter of the forward sleeve so as to be mountable into the forward sleeve and extend from end 46 to end 47 of the forward sleeve. The inner surface of the positionable housing 100 is of irregular cross section, as shown in FIG. 9, and extends around the outer periphery of the gear racks, clevis and the compound gear cluster. Thus, the clevis and gear cluster may pass through the housing 100 without engaging the inner surface of the housing. However, gear rack 90 is floating, (not fixidly mounted) within the rear sleeve, engaging only portions of the inner periphery of the housing so as to maintain its position in contact with gear 31.

The clevis 28 is formed in much the same manner as in the presently preferred embodiment. However, the sides 27 are much shorter and the base 25 is disposed adjacent the gear cluster 30 as shown in FIG. 8. Thus, the thickened portion 21 of the perforating pin 20 is slightly longer than in the preferred embodiment and is capable of being disposed over the gear tracks 92 of gear rack 91 without contact.

The cap 70 is coupled to the back end 55 of the rear sleeve by, crimping, glueing or with mateable threads. The forward end 71 of cap 70 is solid and is disposed within the end of the rear sleeve. The back end 74 of the cap is extruded, forming a projecting end which has an aperture 72 therethrough. The projecting end is capable of being coupled to a machine driven apparatus for providing mechanical punching capabilities or tied to a string which may be secured to the punching apparatus preventing loss of the instrument. An additional feature of this embodiment is that the perforating end 84 is barbed to provide improved contact between the chip being punched from a record card and the end of the perforating pin.

The stylus is assembled by disposing the spring about the perforating pin and coupling the perforating pin to the clevis. The clevis, gear cluster, spring and perforating point and are then positioned within the forward sleeve and the forward sleeve is placed within the rear sleeve such that gear tracks 32 and 34 engage gears 62. Gear rack 90 is then disposed within the rear sleeve by engaging it with gear 31. Last cap 70 is coupled to the rear housing and end 95 of gear rack 90 engages forward end 71 of cap 70. The device thus is assembled, maintained in equilibrium as shown in FIG. 7 and is employed to punch cards in the same manner as in the presently preferred embodiment.

Thus, while the invention has been disclosed and described with respect to a preferred embodiment thereof, it will be understood by those skilled in the art that various changes in form and detail may be made therein without departing from the spirit and scope of the invention.

I claim:

1. A stylus for punching scored areas from pre-scored sheet members comprising:

a. a housing having a first and second portion, said first postion insertable into said second portion, said first portion having a first gear rack and said second portion having a second gear rack;

b. a compound gear means disposed in said housing being engageable with said first and second gear racks for providing a mechanical advantage; and, c. a perforating means coupled to said gear means, said perforating means capable of being forced through one end of said housing;

whereby, a driving force may be applied to said second portion of said housing, and transmitted to said perforating means, said perforating means capable of exerting a force greater than said driving force.

2. The stylus of claim 1, wherein said compound gear cluster is formed from three gears all rotably mounted on an axis, said axis coupled to said perforating means, said gear cluster having a first, second and third gear, said second and third gears having the same diameter which is smaller than the diameter of said first gear.

3. The stylus of claim 1, wherein a stop is disposed on said second gear rack for preventing said first gear from becoming untracked.

4. The stylus of claim 1, wherein a thickened portion is disposed on one end of said second portion of said housing and also on one end of said first portion of said housing such that said thickened portions engage each other and prevent said first and second portions of said housing from becoming disengaged.

5. The stylus of claim 1, wherein a spring means is disposed between said gear means and the end of said first portion of said housing for urging said first portion from said second portion.

6. The stylus of claim 1, wherein said perforating means is coupled to a clevis, said clevis being coupled to said gear cluster and said axis, said perforating means capable of being disposed through an aperture in the end of said second portion of said housing.

7. The stylus of claim 1, wherein the point of said perforating means is barbed.

8. A stylus for punching scored areas from prescored sheet members comprising:

a. a cylindrical housing having a first and second portion, said first portion being into insertable and coaxial with said second portion, said first portion having one end with an aperture disposed therethrough and a thickened portion on the end opposite said one end, said second portion having thickened on one end engageable with said thickened portion of said first portion of said housing for preventing said first and second portions of said housing from disengaging;

b. a first gear rack coupled to the interior wall of said housing, positioned near the end opposite said one end;

c. a second gear rack coupled to the interior wall of said second portion, said second gear rack attached to said wall of said second portion;

d. a compound gear cluster formed from a first, second and third gear, coupled together and rotable mounted on an axis in said housing, said first gear being engageable with said second gear rack and said second and third gears being engageable with said first gear rack, said gear cluster capable of providing a mechanical advantage;

e. a perforating means coupled to said gear cluster, said perforating means capable of being driven through said aperture in said one end of said first portion for punching a scored area from said card;

f. a spring means for urging said first and second portions of said housing away from each other, disposed in said housing between said gear cluster and said one end of said first portion;

whereby, a driving force may be applied to said second portion and transmitted to said perforating means, said perforating means capable of exerting a force greater than said driving force.

9. The stylus of claim 8 wherein the point of said perforating means is barbed.

10. A stylus for punching scored areas from prescored sheet members comprising:

a. a housing having a first and second portion, said first portion and said second portion positioned for relative motion with respect to one another, one of said portions having a first gear member and said other portion having a second gear member;

b. a gear means disposed in said housing being engageable with said first and second gear members for increasing the force applied to one of said portions; and, c. a perforating means for moving in said housing to extend beyond said housing and for applying said increased force to said pre-scored sheet members, said perforating means coupled to said gear means;

whereby, a driving force may be applied to said one portion of said housing, and transmitted to said perforating means, said perforating means exerting a force greater than said driving force to remove said scored areas.

* * * * *